US011548415B2

(12) United States Patent
Chintapudi et al.

(10) Patent No.: US 11,548,415 B2
(45) Date of Patent: Jan. 10, 2023

(54) ADJUSTABLE SWIVELING PASSENGER SEAT ASSEMBLY

(71) Applicant: Rockwell Collins, Inc., Cedar Rapids, IA (US)

(72) Inventors: Sreekanth Chintapudi, Weston, FL (US); Hau Phuc Ho, Pembroke Pines, FL (US); John Iossifidis, Miami, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1003 days.

(21) Appl. No.: 16/247,887

(22) Filed: Jan. 15, 2019

(65) Prior Publication Data
US 2019/0232825 A1 Aug. 1, 2019

Related U.S. Application Data

(60) Provisional application No. 62/624,032, filed on Jan. 30, 2018.

(51) Int. Cl.
*B64D 11/06* (2006.01)
*B60N 2/14* (2006.01)
*B60N 2/015* (2006.01)
*B60N 2/68* (2006.01)

(52) U.S. Cl.
CPC ......... *B60N 2/146* (2013.01); *B60N 2/01558* (2013.01); *B60N 2/14* (2013.01); *B60N 2/682* (2013.01); *B64D 11/064* (2014.12); *B64D 11/0648* (2014.12); *B64D 11/0696* (2013.01); *B60N 2/143* (2013.01)

(58) Field of Classification Search
CPC ............ B64D 11/0696; B64D 11/0648; B64D 11/064
See application file for complete search history.

(56) References Cited

U.S. PATENT DOCUMENTS 6,000,659 A * 12/1999 Brauer ............... B64D 11/0619
244/118.6
6,691,970 B1 * 2/2004 Sutton, Sr. ............... B60N 2/14
248/425
9,211,812 B2 * 12/2015 Haller ..................... B60N 2/509
(Continued)

FOREIGN PATENT DOCUMENTS

WO 2006041570 A1 4/2006

OTHER PUBLICATIONS

Extended European Search Report dated Jun. 24, 2019 for EP Application No. 19154377.6.

*Primary Examiner* — Assres H Woldemaryam
*Assistant Examiner* — Shanna Danielle Glover
(74) *Attorney, Agent, or Firm* — Suiter Swantz pc llo

(57) ABSTRACT

An adjustable swiveling passenger seat assembly is disclosed. The adjustable swiveling passenger seat assembly includes a set of base rails coupled to a floor. The adjustable swiveling passenger seat assembly further includes a plurality of pitch clevises coupled on a top surface of each of the set of base rails. The adjustable swiveling passenger seat assembly includes a swivel outer plate aligned in parallel relative to the floor. The swivel outer plate of the adjustable swiveling passenger seat assembly further includes a plurality of slots located on corners of the swivel outer plate and a plurality of spacers disposed within the plurality of slots.

20 Claims, 14 Drawing Sheets

(56) References Cited

U.S. PATENT DOCUMENTS

| | | | |
|---|---|---|---|
| 9,663,001 B2* | 5/2017 | Haller | B60N 2/146 |
| 9,950,645 B2* | 4/2018 | Patterson | B60N 2/146 |
| 2003/0094842 A1* | 5/2003 | Williamson | B60N 3/004 |
| | | | 297/452.48 |
| 2003/0184141 A1* | 10/2003 | Kanai | B60N 2/146 |
| | | | 297/344.22 |
| 2008/0035828 A1* | 2/2008 | Kennedy | B64D 11/0696 |
| | | | 248/544 |
| 2008/0290706 A1* | 11/2008 | Yamada | B60N 2/0742 |
| | | | 297/240 |
| 2010/0102611 A1 | 4/2010 | Bunea et al. | |
| 2011/0133030 A1* | 6/2011 | Kennedy | B64D 11/0649 |
| | | | 244/118.5 |
| 2013/0161990 A1 | 6/2013 | Oleson | |
| 2014/0159436 A1* | 6/2014 | Iacobucci | B60N 2/77 |
| | | | 297/75 |
| 2014/0191081 A1* | 7/2014 | Ward | B64D 11/0619 |
| | | | 248/429 |
| 2017/0045080 A1* | 2/2017 | Grether | F16B 5/0225 |
| 2018/0044025 A1* | 2/2018 | Brodish | B64D 11/0691 |
| 2019/0077513 A1* | 3/2019 | Oleson | B64D 11/0648 |

* cited by examiner

ADJUSTABLE SWIVELING PASSENGER SEAT ASSEMBLY

CROSS-REFERENCE TO RELATED APPLICATIONS

The present application claims priority under 35 U.S.C. § 119(e) to U.S. Provisional Patent Application Ser. No. 62/624,032, entitled NO SPAR BASE PITCH CLEVISES, filed on Jan. 30, 2018, naming Sreekanth Chintapudi and Hau Phuc Ho as inventors, which is incorporated herein by reference in the entirety.

TECHNICAL FIELD

The present invention generally relates to aircraft passenger seat base, and, in particular, adjustable swiveling passenger seat assembly.

BACKGROUND OF THE INVENTION

Many private and executive aircraft passenger seats have comfort features such as the ability to swivel the seat from one side to the other and slide the seat forward (i.e., fore) and backward (i.e., aft) that are not typically found in commercial passenger aircraft. A swivel assembly of the passenger seat allows for rotating the passenger seat by 360 degrees. Swiveling seats have a seat pan that is mounted on a swivel assembly that in turn is mounted on top of laterally-extending spars (i.e., sparvels) that extend transversely between a pair of base rails mounted by floor fittings to tracks in the aircraft deck. In general, typical swiveling seats take up floor space due to the compliance with Federal Aviation Administration (FAA) mandated safety requirements, which limits numbers of the swiveling seats that can be installed within a fuselage. Additionally, weights of such swiveling seat lead to a decrease in fuel efficiency of the aircraft.

SUMMARY

In one aspect, the inventive concepts disclosed herein are directed to an adjustable swiveling passenger seat assembly. The adjustable swiveling passenger seat assembly may include a set of base rails coupled to a floor and the set of base rails may be aligned in parallel; The adjustable swiveling passenger seat assembly may include a plurality of pitch clevises coupled on a top surface of each of the set of base rails. The plurality of pitch clevises may be configured to provide a mechanical strength and stability to support a passenger seat in absence of spars. The adjustable swiveling passenger seat assembly may include a swivel plate aligned in parallel relative to the floor. The swivel plate may include a plurality of slots located on corners of the swivel plate and a plurality of spacer plates disposed within the plurality of slots. The swivel plate may be coupled to the set of base rails with the plurality of pitch clevises through the plurality of the spacer plates.

In a further aspect, the inventive concepts disclosed herein are directed to an adjustable aircraft swiveling passenger seat. The adjustable aircraft swiveling passenger seat may include a set of base rails coupled to a floor within an aircraft. The set of base rails may be aligned in parallel to each other and are in parallel with a direction of travel. The adjustable aircraft swiveling passenger seat may include a plurality of pitch clevises coupled on a top surface of each of the set of base rails. The plurality of pitch clevises may be configured to provide a mechanical strength and stability in absence of spars. The adjustable aircraft swiveling passenger seat may include a swivel plate aligned in parallel relative to the floor. The swivel plate may include a plurality of slots located on corners of the swivel plate and a plurality of spacer plates disposed within the plurality of slots. The swivel plate may be coupled to the set of base rails with the plurality of pitch clevises through the plurality of the spacer plates. The adjustable aircraft swiveling passenger seat may include a swivel seat mounted on the swivel plate.

In a further aspect, the inventive concepts disclosed herein are directed to an adjustable aircraft swiveling passenger seat assembly. The adjustable aircraft swiveling passenger seat assembly may include a set of base rails aligned in parallel to each other and are in parallel with a direction of travel. The adjustable aircraft swiveling passenger seat assembly may include a plurality of floor fittings configured to couple each of the set of base rails with the floor of the aircraft. The adjustable aircraft swiveling passenger seat assembly may include a plurality of pitch clevises coupled on a top surface of each of the set of base rails. The plurality of pitch clevises may be configured to provide mechanical strength and stability in absence of spars. The adjustable aircraft swiveling passenger seat assembly may include a plurality of clevis pins configured to couple the plurality of pitch clevises with each of the set of base rails. The plurality of clevises pins may be perpendicularly aligned relative to each of the set of base rails and aligned in parallel relative to the floor within the aircraft. The adjustable aircraft swiveling passenger seat assembly may include a swivel plate aligned in parallel relative to the floor. The swivel plate may include a plurality of slots located on corners of the swivel plate and a plurality of spacer plates disposed within the plurality of slots. The swivel plate may be coupled to the set of base rails with the plurality of pitch clevises through the plurality of the spacer plates.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1A:
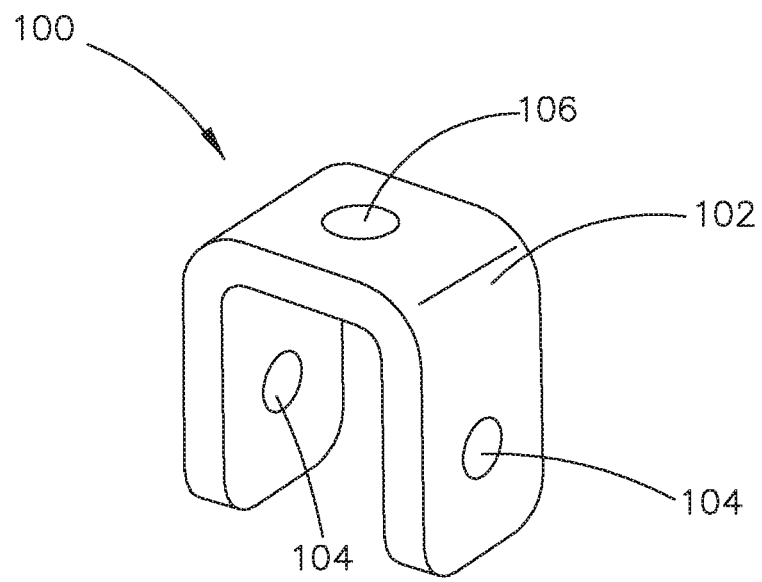
FIG. 1A illustrates an isometric view of a pitch clevis, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Embodiments of the present disclosure are directed to a pitch clevis disposed on a pair of base rails mounted by floor fittings to tracks in aircraft deck to securely attach a base assembly to the rest of a passenger seat without any spar. Additionally, embodiments of the present disclosure are directed to a swivel base which is equipped with an adjustable spacer plate. This allows for controlling a width between a pair of base rails. Embodiments of the present disclosure allow for not only reducing a floor space needed to install a swiveling passenger seat assembly, but also reducing an overall weight of the swiveling passenger seat assembly, which is translated into cost savings for aircraft operators. Further, embodiments of the present disclosure allow for installing the swiveling passenger seat in locations previously not possible due to the small footprint of the swiveling seat assembly.

Now referring to FIG. 1A, FIG. 1A illustrates an isometric view of a pitch clevis, in accordance with one or more embodiments of the present disclosure. In one embodiment, a pitch clevis 100 includes a clevis (i.e., clevis pin or clevis fastener) 102 to be disposed on top of a base rail of a base assembly. The clevis 102 of the pitch clevis 100 may be shaped such that the clevis 102 is both securely tighten to a base rail of a base assembly and hold a swivel assembly on top of the pitch clevis 100. For example, the clevis 102 of the pitch clevis 100 may be shaped as a U-shaped piece or a rectangle shaped piece (FIG. 1C). It is noted that, while the clevis 102 of the pitch clevis 100 depicted in FIG. 1A is shown as a U-shaped piece, such a configuration is merely provided for illustrative purposes. Embodiments of the present disclosure may allow for utilizing other shapes of the clevis 102 including, but are not limited to, V-shape, C-shape, or the like.

In one embodiment, the pitch clevis 100 includes side holes 104 disposed at the end of the clevis 102 (i.e., prongs) to accept a clevis pin (e.g., bolt, tang, or the like). For example, the side holes 104 of the pitch clevis 100 may be dimensioned to accept the clevis pin which satisfy FAA safety requirements. The clevis pin used for the pitch clevis 100 may include threaded or unthreaded clevises pins. For instance, the unthreaded clevis pins may include a cotter pin (i.e., a split pin or cotter kay). In another instance, the threaded clevis pins may have a partially threaded shank on one end and a formed head on the other. The formed-head has a lip, which acts as a stop when threading the clevis pin into the shackle, and a flattened tab with a cross-hole. The clevis pins may be installed to secure the pitch clevis 100 perpendicularly to the base rails.

In one embodiment, the pitch clevis 100 includes a top hole 106 disposed on a top surface of the clevis 102 to mount a swivel assembly with a clevis pin (e.g., bolt, tang, or the like). For example, the top hole 106 of the pitch clevis 100 may be dimensioned to accept a pin (e.g., bolt, tang, or the like) which satisfy FAA safety requirements. The pin used for securing the swivel assembly may include threaded and unthreaded pins. It is noted that the top hole 106 may be located significantly center (i.e., symmetry around a rotation by 180 degrees) to distribute weight equally from a seat assembly installed on top of the pitch clevis 100 to base rails.

Figure 1B:
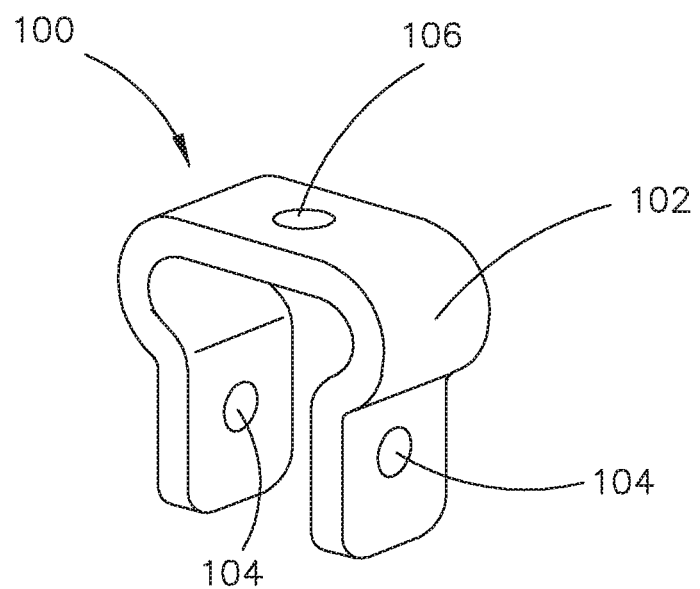
FIG. 1B illustrates an isometric view of a pitch clevis, in accordance with one or more embodiments of the present disclosure.
Figure 1C:
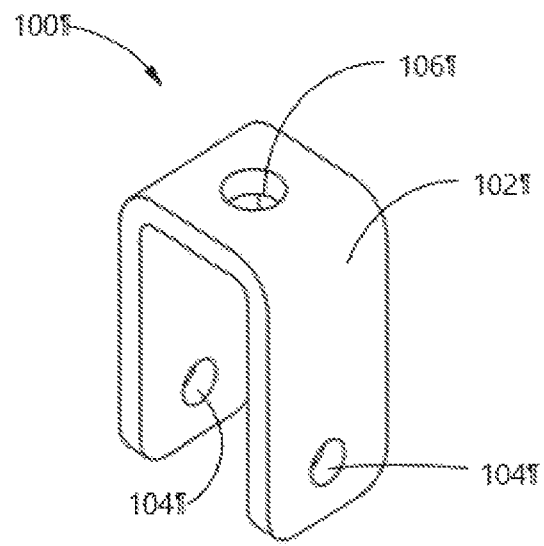
FIG. 1C illustrates an isometric view of a pitch clevis, in accordance with one or more embodiments of the present disclosure.

Referring now to FIG. 1B, FIG. 1B illustrates an isometric view of a pitch clevis, in accordance with one or more embodiments of the present disclosure. In one embodiment, a pitch clevis 100 includes a clevis (i.e., clevis pin or clevis fastener) 102 to be disposed on top of a base rail of a base assembly. The clevis 102 of the pitch clevis 100 may be shaped such that the clevis 102 is both securely tighten to a base rail of a base assembly and hold a swivel assembly on top of the clevis 102. Further, the shape of the pitch clevis 100 may allow for reducing an overall height of the swiveling passenger seat and giving more mechanical strength and stability to the pitch clevis 100. For example, the clevis 102 of the pitch clevis 100 may be shaped as a T-shaped piece (i.e., mushroom-like shape). It is noted that, while the clevis 102 of the pitch clevis 100 depicted in FIG. 1B is shown as a T-shaped piece, such a configuration is merely provided for illustrative purposes. Embodiments of the present disclosure may be configured to adapt any shape of the pitch clevis 100 to reduce the overall height of the swiveling passenger seat and to give mechanical strength and stability to the pitch clevis 100.

In some embodiments, the pitch clevis 100 may include side holes 104 disposed at the end of the clevis 102 (i.e., prongs) to accept a clevis pin (e.g., bolt, tang, or the like). Further, the pitch clevis 100 may include a top hole 106 disposed on a top surface of the clevis 102 to mount a swivel assembly with a pin (e.g., bolt, tang, or the like). The top hole 106 may be located significantly center (i.e., symmetry around a rotation by 180 degrees) to distribute weight equally from a seat assembly installed on top of the pitch clevis 100 to base rails.

Referring now to FIG. 1C, FIG. 1C illustrates an isometric view of a pitch clevis, in accordance with one or more embodiments of the present disclosure. In one embodiment, a pitch clevis 100 includes a clevis (i.e., clevis pin or clevis fastener) 102, side holes 104, and a top hole 106. Embodiments of the present disclosure may be configured to give mechanical strength and stability to the pitch clevis 100. For example, the pitch clevis shown in FIG. 1C is an elongated version of the pitch clevis shown in FIG. 1A. The length of the pitch clevis may differ depending on the FAA requirements and various aircraft types.

Figure 1D:
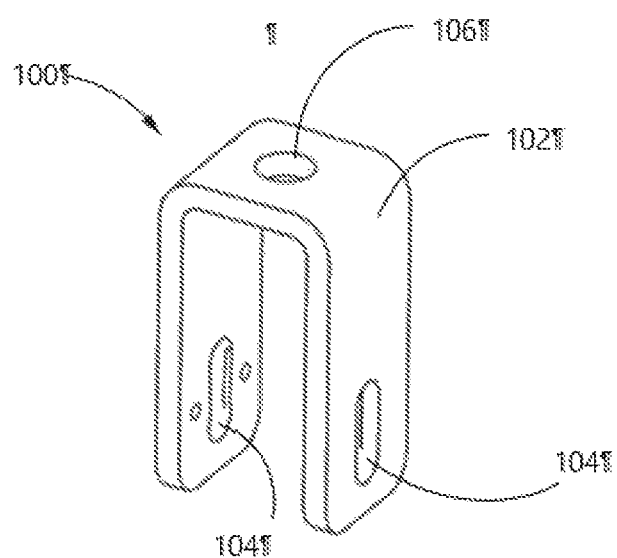
FIG. 1D illustrates an isometric view of a pitch clevis, in accordance with one or more embodiments of the present disclosure.

Referring now to FIG. 1D, FIG. 1D illustrates an isometric view of a pitch clevis, in accordance with one or more embodiments of the present disclosure. In one embodiment, a pitch clevis 100 includes a clevis (i.e., clevis pin or clevis fastener) 102, side holes 104, and a top hole 106. The side holes 104 of the pitch clevis 100 shown in FIG. 1D may be oblong. The oblong holes may allow for adjusting a height which the pitch clevis 100 is installed onto the pair of base rails. It is noted that the oblong side holes may be disposed on any shape of the pitch clevises described herein. It is contemplated that, while the pitch clevises with oblong side holes are specifically designed to be used on fore section of the base rails, such a configuration is merely provided for exemplary purposes. The pitch clevises with oblong side holes may be utilized on aft section of the base rails as well.

It is noted that significant force and pressure may exert on the pitch clevises 100 during a use of a swiveling passenger seat on aircraft. In this regard, the pitch clevises 100 may be formed from durable materials. For example, the pitch clevises 100 may be formed from metals and alloys. For instance, the metals and alloys used to form the pitch clevises 100 may include carbon steel, steel iron nickel alloy, stainless steel, tungsten, tungsten carbide, titanium, titanium aluminide, Inconel™, chromium, iron, aluminum, or the mixture thereof. Further, the pitch clevises 100 may be formed from other materials. For example, the pitch clevises 100 may be formed from composite materials, carbon fibers, polymers, or the mixture thereof. In this sense, the pitch clevises 100 formed form composite materials, carbon fibers, or the mixture may possess the comparable mechanical strength and stability to the pitch clevises 100 formed from the metals and alloys with the benefit of being light weights.

In some embodiments, the pitch clevises 100 may be formed by various methods. For example, the pitch clevises 100 may be formed by sheet metal method, machine block method, or the like. Depending on strengths of the materials used to form the pitch clevises 100, an overall swiveling passenger seat height may be adjusted. For example, the overall swiveling passenger seat height may be reduced by changing the materials used to form the pitch clevises 100 from aluminum to steel. By way of another example, the overall swiveling passenger seat height may be adjusted by implementing different pitch clevis designs (e.g., U-shape, V-Shape, C-Shape, elongated T-shape, or the like).

It is noted that, while top holes of the pitch clevis shown in FIGS. 1A-1D shows as one hole on the top surface, such a configuration is merely provided for illustrative purposes. Embodiments of the present disclosure may be configured to include more than one top hole on the pitch clevis. For example, embodiments of the present disclosure may be configured to include two, three, four, or more top holes. This may allow for adjusting installation positions of a swivel base, while the pitch clevis, base rails, and floor fittings are installed on the same place of a floor within an aircraft. Additionally, the top holes of the pitch clevises shown in FIGS. 1A-1D may have oblong holes to further provide the pitch clevis with more versatilities to be installed on various positions relative to a swivel base.

Figure 2A:
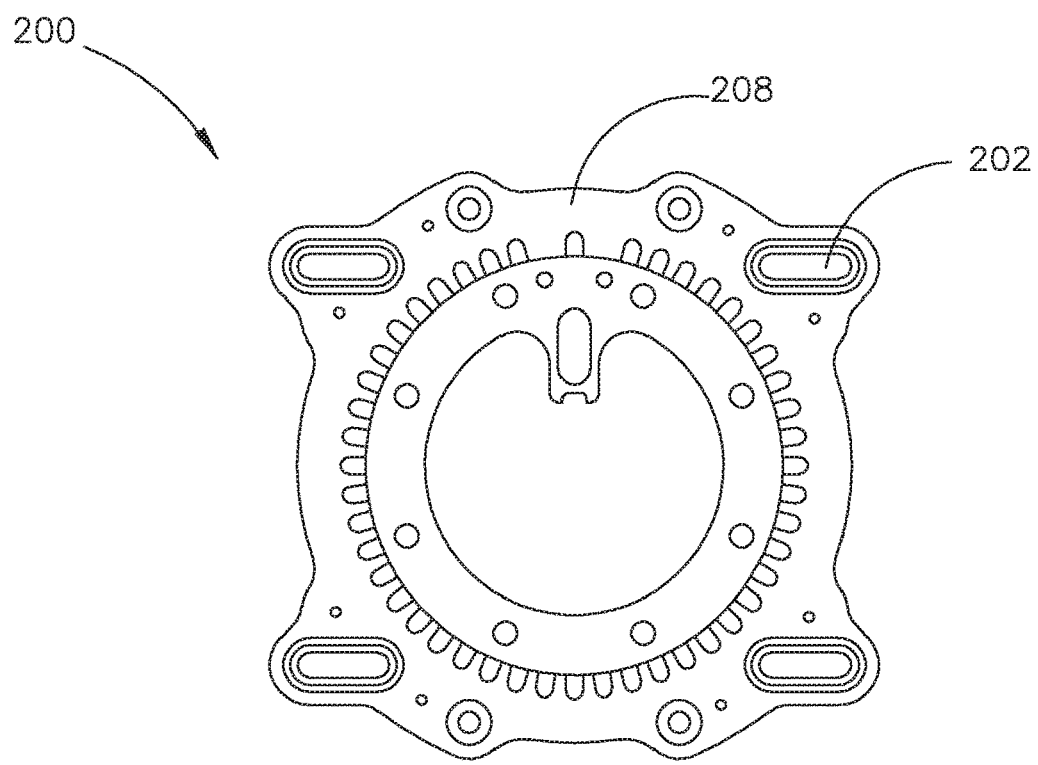
FIG. 2A illustrates a top view of a swivel assembly, in accordance with one or more embodiments of the present disclosure.

Referring now to FIG. 2A, FIG. 2A illustrates a top view of a swivel assembly, in accordance with one or more embodiments of the present disclosure. In one embodiment, a swivel assembly 200 of the swiveling passenger seat includes a swivel outer plate 208. The swivel outer plate 208 may provide a direct transfer of seat loading to the rest of the swiveling base assembly and accept a seat on top of the swivel outer plate 208. The swivel outer plate 208 of the swivel assembly 200 may include a swivel slot 202 (i.e., aperture, slot, or opening). For example, the swivel outer plate 208 may include more than one slots 202 and each slot is located at corners of the swivel outer plate 208 as shown in FIG. 2A. The swivel slot 202 of the swivel outer plate 208 may be oblong shape and all of the swivel slots may face the same direction. In this sense, the swivel slots 202 may be aligned in parallel. The swivel slot 202 may include an internal recess. For example, the swivel slot 202 within the swivel outer plate 208 may include a combination of vertical and lateral recess (e.g., a stepwise recess). By way of another example, the swivel slot 202 within the swivel outer plate 208 may include a recess with slopes (e.g., a bevel structure). By way of yet another example, the swivel slot 202 within the swivel outer plate 208 may include a recess with curvatures. The swivel slot 202 within the swivel outer plate 208 may include a recess with a mix of vertical, lateral, slopes, and/or curvatures.

Figure 2B:
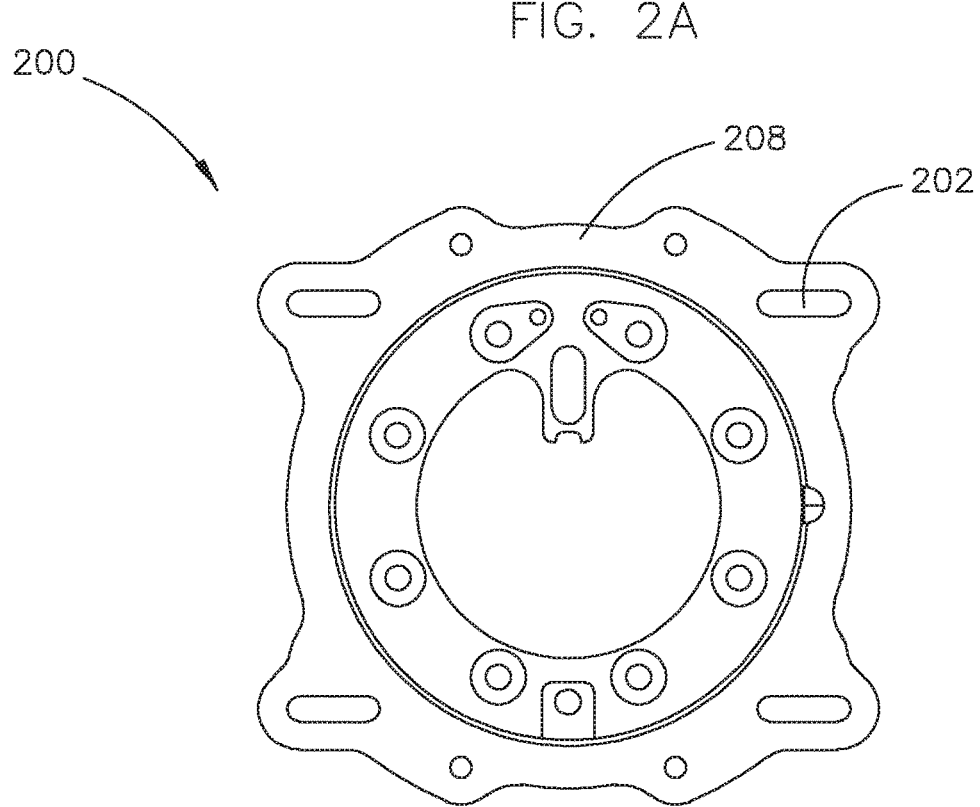
FIG. 2B illustrates a bottom view of a swivel assembly, in accordance with one or more embodiments of the present disclosure.

Referring now to FIG. 2B, FIG. 2B illustrates a bottom view of a swivel base, in accordance with one or more embodiments of the present disclosure. In one embodiment, a swivel assembly 200 of the swiveling passenger seat includes a swivel outer plate 208 and a swivel slot 202.

Figure 3A:
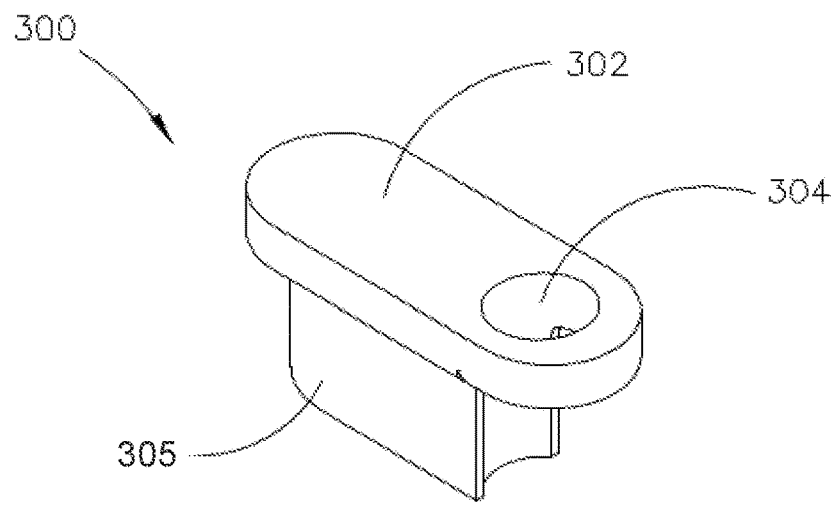
FIG. 3A illustrates an isometric view of a swivel spacer, in accordance with one or more embodiments of the present disclosure.
Figure 3B:
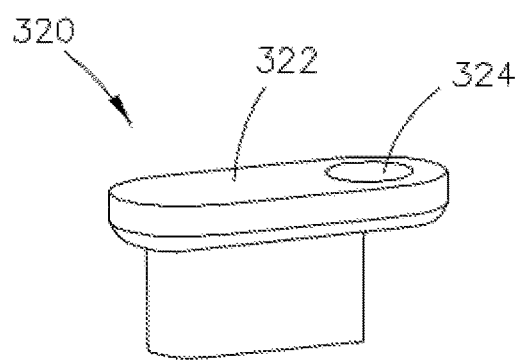
FIG. 3B illustrates an isometric view of a swivel spacer, in accordance with one or more embodiments of the present disclosure.
Figure 3C:
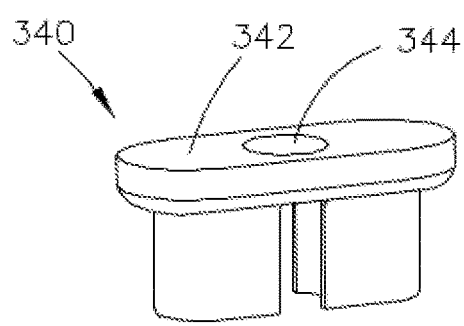
FIG. 3C illustrates an isometric view of a swivel spacer, in accordance with one or more embodiments of the present disclosure.

Referring now to FIGS. 3A-3C, FIG. 3A illustrates an isometric view of a swivel spacer, in accordance with one or more embodiments of the present disclosure. In one embodiment, a swivel spacer 300 (i.e., a spacer) includes a top spacer surface 302. For example, the top spacer surface 302 may be installed flush with the swivel outer plate 208 when the swivel spacer 300 is disposed within the swivel slot 202. By way of another example, the top spacer surface 302 may be installed inside a cavity of the swivel slot 202 when the swivel spacer 300 is disposed within the swivel slot 202 to accommodate a securing pin (e.g., bolt, pin, or the like) height such that the top of the securing pin is flush with the surface of the swivel outer plate 208.

In one embodiment, a swivel spacer 300 includes an aperture 304. The aperture 304 of the swivel spacer 300 may accept a securing pin (e.g., bolt, pin, or the like) to couple the swivel outer plate 208 and a pitch clevis 100. The location of the aperture 304 within the swivel spacer 300 may differ depending on the configurations of a swiveling passenger seat. For example, the aperture 304 of the swivel spacer 300 may be located on either side (e.g., a right or left side). FIG. 3A illustrates that the aperture 304 of the swivel spacer 300 is located on one side. It is noted that the location of the aperture 304 is changed simply by rotating 180 degrees. These configurations may provide six-inch width or eight-inch width footprints of the swiveling passenger seat assembly (e.g., 500 and 520 on FIG. 5). By way of another example, the aperture 304 of the swivel spacer 300 may be located in the middle (i.e., a center). FIG. 3C illustrates that the aperture 344 of the swivel spacer 340 is located on in the middle of the top spacer surface 342. This configuration may provide seven-inch width footprint of the swiveling passenger seat assembly (e.g., 540 on FIG. 5).

In one embodiment, a swivel spacer 300 includes a spacer protrusion 305. The spacer protrusion 305 may fit within the swivel slot 202 of the swivel outer plate 208. The dimensions of the spacer protrusion 305 may depend on the internal structure of the swivel slot 202 within the swivel outer plate 208. For example, the swivel slot 202 within the swivel outer plate 208 may include a combination of vertical and lateral recess (e.g., a stepwise recess). By way of another example, the swivel slot 202 within the swivel outer plate 208 may include a recess with slopes (e.g., a bevel structure). By way of yet another example, the swivel slot 202 within the swivel outer plate 208 may include a recess with curvatures.

In one embodiment, the spacer plate 300 is formed from durable materials. For example, the spacer plate 300 may be formed from metals and alloys. For instance, the metals and alloys used to form the spacer plate 300 may include carbon steel, steel iron nickel alloy, stainless steel, tungsten, tungsten carbide, titanium, titanium aluminide, Inconel™, chromium, iron, aluminum, or the mixture thereof. Further, the spacer plate 300 may be formed from other materials. For example, the spacer plate 300 may be formed from composite materials, carbon fibers, polymers, or the mixture thereof.

Figure 4A:
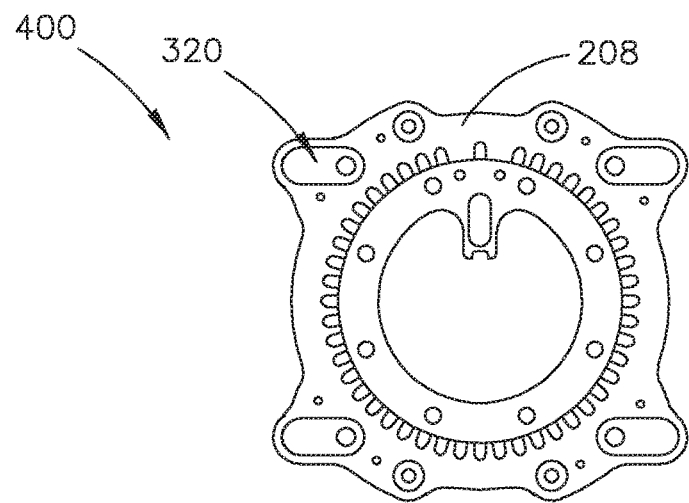
FIG. 4A illustrates a top view of a swivel assembly with a swivel spacer, in accordance with one or more embodiments of the present disclosure.
Figure 4B:
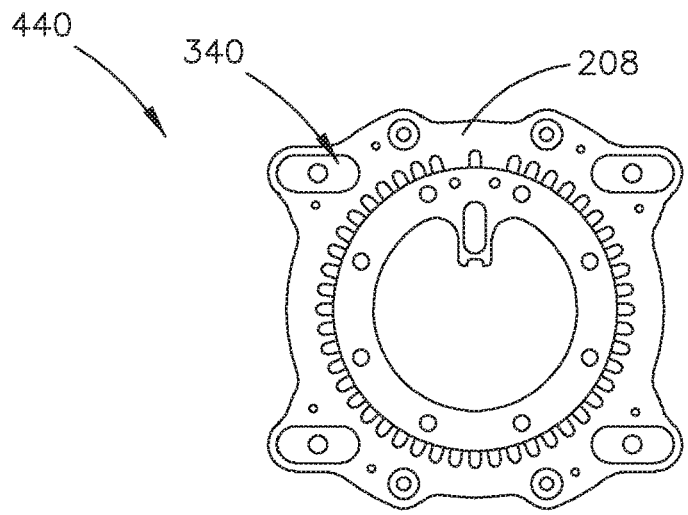
FIG. 4B illustrates a top view of a swivel assembly with a swivel spacer, in accordance with one or more embodiments of the present disclosure.
Figure 4C:
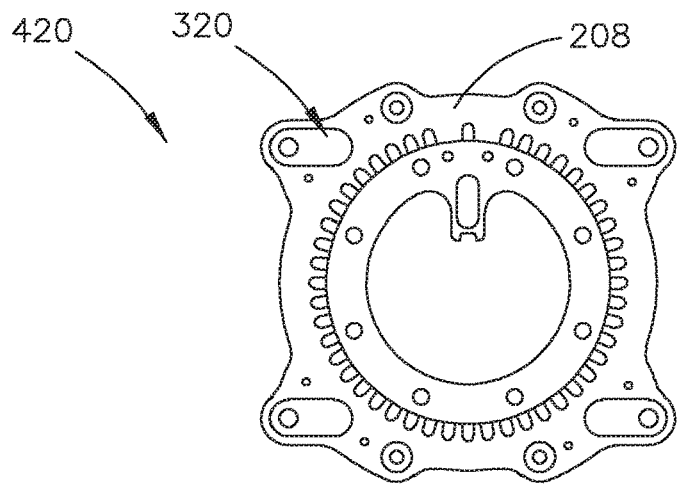
FIG. 4C illustrates a top view of a swivel assembly with a swivel spacer, in accordance with one or more embodiments of the present disclosure.

Referring now to FIGS. 4A-4C, FIGS. 4A-4C illustrate a top view of a swivel assembly with a swivel spacer, in accordance with one or more embodiments of the present disclosure. In one embodiment, a swivel spacer 320 is placed within a swivel slot of a swivel outer plate 208 of a swivel assembly 400. Apertures of the swivel spacer 320 may all face toward the center (i.e., creating inward holes) of the swivel assembly 400 (FIG. 4A). This configuration may allow for an installation of a pair of base rails with the narrowest width. The width of this configuration (500 on FIG. 5) may be six inches (15.2 cm) which is a half of what a current width that a swivel seat is installed. In this sense, embodiments of the present disclosure allow for drastically reducing a floorspace (i.e., footprint) where a swivel seat is installed.

In another embodiment, apertures of the swivel spacer 320 may all face toward the outside (i.e., creating outward holes) of the swivel assembly 400 (FIG. 4C). This configuration may allow for an installation of a pair of base rails with narrower width than the typical width of a swivel seat and the widest width among the configurations disclosed herein. The width of this configuration (520 on FIG. 5) may be eight inches (20.3 cm) which is still narrower than what a current width that a swivel seat is installed.

In another embodiment, a swivel spacer 340 equipped with an aperture in the center of the swivel spacer 340 is placed within a swivel slot of a swivel outer plate 208 of a swivel assembly 440. Apertures of the swivel spacer 340 may be located in between the configuration 400 and 420

(FIG. 4B) (i.e., creating center holes). This configuration (540 on FIG. 5) may allow for an installation of a pair of base rails with a width of seven inches (17.8 cm).

It is noted that simply changing the locations of the aperture of the swivel spacer 320 and 340 on the swivel outer plate 208 allows for adjusting a width between the pair of base rails. It is contemplated that, while the widths shown in FIGS. 4A-4C are illustrated as six, seven, and eight inches, such a configuration is merely provided for illustrative purposes. Embodiments of the present disclosure may be configured to provide more versatilities in terms of adjusting a width between the pair of base rails. For example, a dimension of the swivel outer plate 208 may be scaled down further to reduce the width between the pair of base rails. For instance, the width between the pair of base rails may include five inches, four inches, or less as long as the swivel seat assembly passes FAA certification criteria. By way of another example, a dimension of the swivel outer plate 208 may be scaled up to increase the width between the pair of base rails. For instance, the width between the pair of base rails may include nine inches, ten inches, or more as long as the swivel seat assembly passes FAA certification criteria.

Figure 5A:
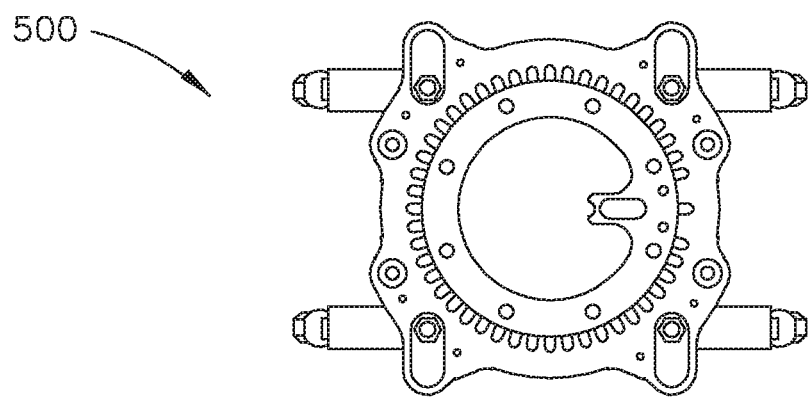
FIG. 5A illustrates a series of top views of a base assembly corresponding to FIG. 4A, in accordance with one or more embodiments of the present disclosure.
Figure 5B:
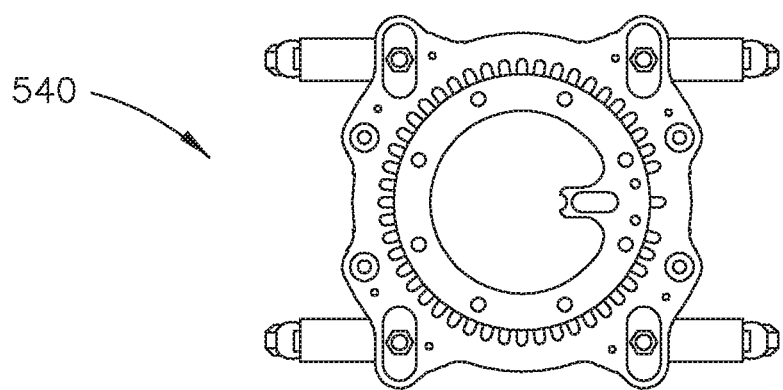
FIG. 5B illustrates a series of top views of a base assembly corresponding to FIG. 4B, in accordance with one or more embodiments of the present disclosure.
Figure 5C:
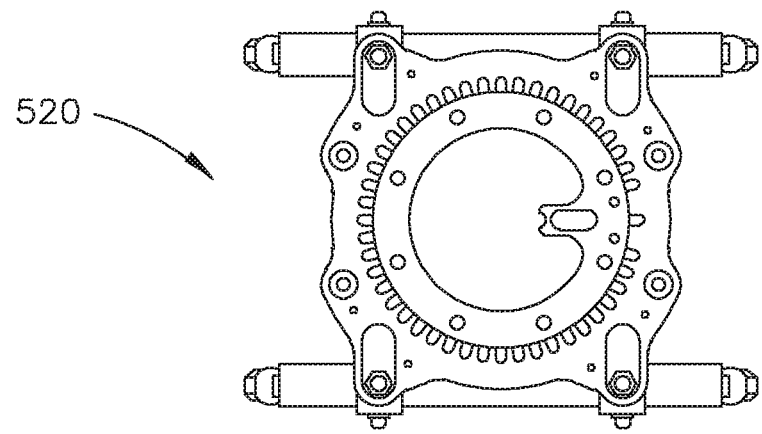
FIG. 5C illustrates a series of top views of a base assembly corresponding to FIG. 4C, in accordance with one or more embodiments of the present disclosure.

FIG. 5 illustrates a series of top views of a base assembly, in accordance with one or more embodiments of the present disclosure. In one embodiment, apertures of the swivel spacer 320 may all face toward the center of the base assembly 500. The swivel assembly 400 may be coupled with a pair of base rails by pitch clevises 100 to form the narrowest width configuration 500. Additionally, apertures of the swivel spacer 320 may all face outside the base assembly 520. The swivel assembly 400 may be coupled with a pair of base rails by pitch clevises 100 to form the widest width configuration 520. Further, apertures of the swivel spacer 320 may be in between the two configurations 500 and 520. The swivel assembly 400 may be coupled with a pair of base rails by pitch clevises 100 to form the medium width configuration 540.

It is noted that embodiments of the present disclosure not only allow for narrower width installation of the base rails (i.e., a swivel seat assembly), but also reduce a weight of swivel base assembly significantly. For example, the current base assembly with 12 inches width weights about 12 pounds (i.e., 5,436 grams), while the base assembly described in this present disclosure weights about 8.5 pounds (i.e., 3,850 grams). A narrower width installation leads to less floor space needed to install swivel seats and a lighter weight of the swivel base assembly leads to less fuel consumption for airline operators.

Figure 6A:
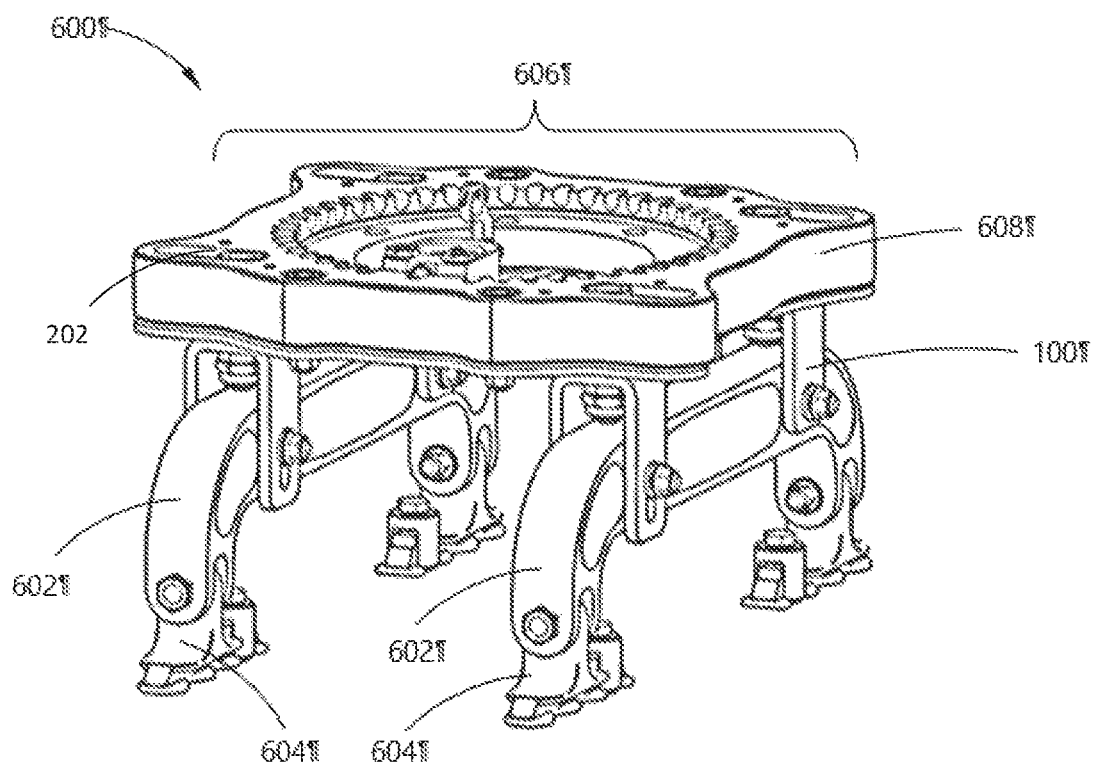
FIG. 6A illustrates a swivel assembly installed on a pair of base rails using pitch clevises, in accordance with one or more embodiments of the present disclosure.

Referring now to FIG. 6A, FIG. 6A illustrates an isometric view of a base assembly installed on a pair (i. e., a set) of base rails using pitch clevises, in accordance with one or more embodiments of the present disclosure. In one embodiment, a base assembly 600 of a swiveling passenger seat includes a pair of base rails 602 attached to an aircraft deck securely coupled by floor fittings 604. For example, the pair of base rails 602 of the base assembly 600 may be installed in parallel both to each other and to a travel direction of the aircraft. The floor fittings 604 may be configured to lock the pair of base rails 602 into a seat track secured to the aircraft deck.

In some embodiments, the base assembly 600 may include pitch clevises 200 mounted on the base rails 302 by clevis pins. For example, the pitch clevises 100 may include side holes 104, top hole 106, and clevises 102, as described hereinbefore. The side holes 104 of the pitch clevises 100 may be used to securely attach to the pair of base rails 602 using the clevis pins. Further, the top hole 106 of the pitch clevises 100 may be utilized to securely support a swivel assembly 606.

In one embodiment, the swivel assembly 606 of the base assembly 600 includes a swivel outer plate 608. The swivel outer plate 608 of the swivel assembly 606 may provide a direct transfer of seat loading to the pair of base rails 602 via the pitch clevises 100. The swivel outer plate 608 of the swivel assembly 606 may be in direct contact with the pitch clevises 100. For example, the swivel outer plate 608 of the swivel assembly 606 and the pitch clevises 100 may be attached securely. For instance, the swivel outer plate 608 of the swivel assembly 606 may be configured to mate the pitch clevises 100 with threaded/unthreaded pins/bolts to securely support the swiveling passenger seat. Alternatively, the swivel outer plate 608 of the swivel assembly 606 may not be in direct contact with the pitch clevises 100. For example, shock absorbing materials (e.g., rubber, polymer, or the like) may be used in between the swivel outer plate 608 of the swivel assembly 606 and the pitch clevises 100. The swivel outer plate 608 may be configured to mount a rotatable swivel ring, which is used to support a swiveling passenger seat and give the ability to rotate the swiveling passenger seat by 360 degrees at a yaw (i.e., vertical) axis of an aircraft. Additionally, the swivel outer plate 608 may be mounted on the base rails 302 and may be installed in parallel to the floor of the aircraft.

It is noted that embodiments of the present disclosure allow for elimination of spars that are typically installed transversely between a pair of the base rails 602 of the base assembly 600 and that enhance structural stability of the base assembly 600 of the swiveling passenger seat without compromising the structural integrity of the base assembly 600. Further, embodiments of the present disclosure may allow for pitching and rolling the swiveling passenger seat by transferring a load directly to the pair of base rails 602 without the spars. Elimination of the spars allows for reducing a total weight of the base assembly 600 of the swiveling passenger seat and minimizing a floor space that is occupied by the base assembly 600 of the swiveling passenger seat. In this regard, embodiments of the present disclosure may provide airlines with more cost and fuel-efficient swiveling seat installation options.

It is contemplated that, while four pitch clevises are shown in FIG. 6A to securely support the swivel assembly 606, such a configuration is merely provided for illustrative purposes. Embodiments of the present disclosure may be configured to utilize any number of pitch clevises to securely support the swivel assembly 606 such as two, three, five, or more pitch clevises. The number of the pitch clevises may depend on a weight and size of the swivel assembly 606.

It is further contemplated that, while the pitch clevises 100 are depicted to securely support the swivel assembly 606 in FIG. 6A, such a configuration is merely provided for illustrative purposes. Embodiments of the present disclosure may be configured to use any of the pitch clevises 100 shown in FIGS. 1A-1D to support the swivel assembly 606. Additionally, embodiments of the present disclosure may be configured to utilize a combination of the pitch clevises shown in FIGS. 1A-1D to securely support the swivel assembly 606. It is noted that the pitch clevises 100 shown in FIG. 1C and FIG. 1D are used such that the pitch clevises shown in FIG. 1D are used as forward clevises and the pitch clevises shown in FIG. 1C are used as aft clevises for a forward-facing seat. For aft-facing seat, the clevises 100 shown in FIG. 1D are used as aft clevises and the pitch clevises shown in FIG. 1C are used as forward clevises.

Figure 6B:
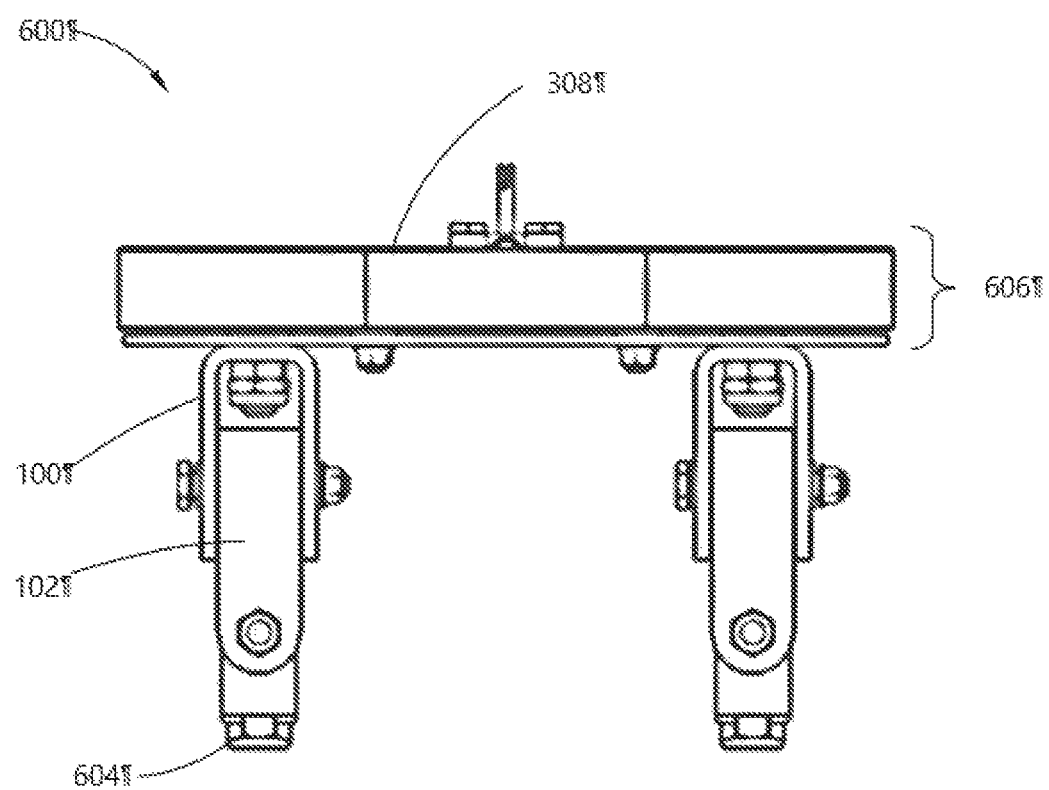
FIG. 6B illustrates a front view of a base assembly depicted in FIG. 6A, in accordance with one or more embodiments of the present disclosure.
Figure 6C:
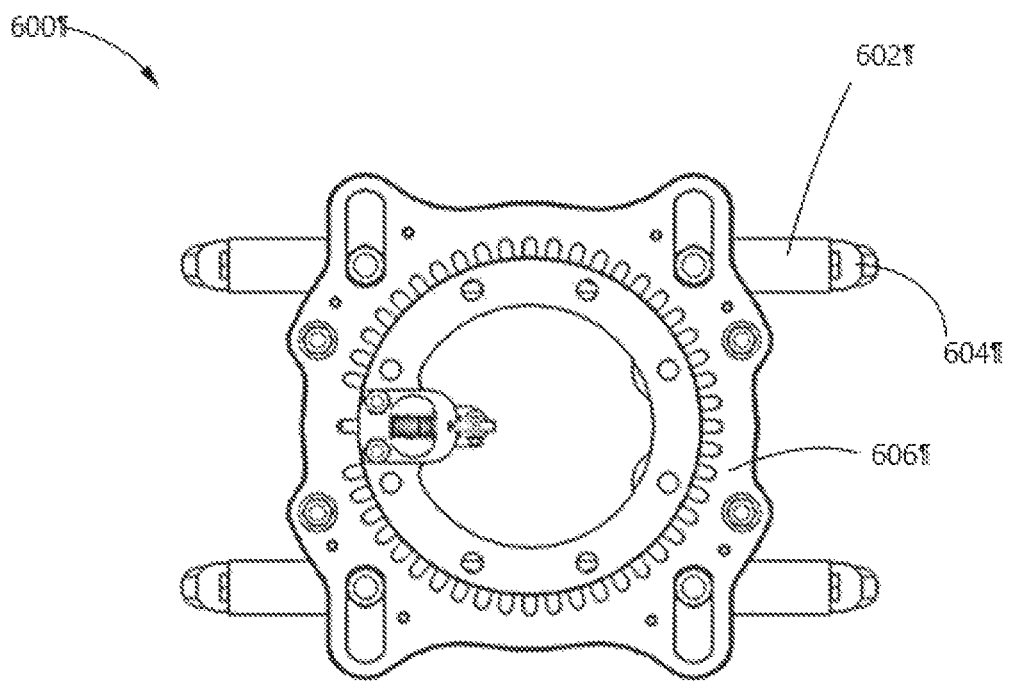
FIG. 6C illustrates a top view of a base assembly depicted in FIG. 6A, in accordance with one or more embodiments of the present disclosure.
Figure 6D:
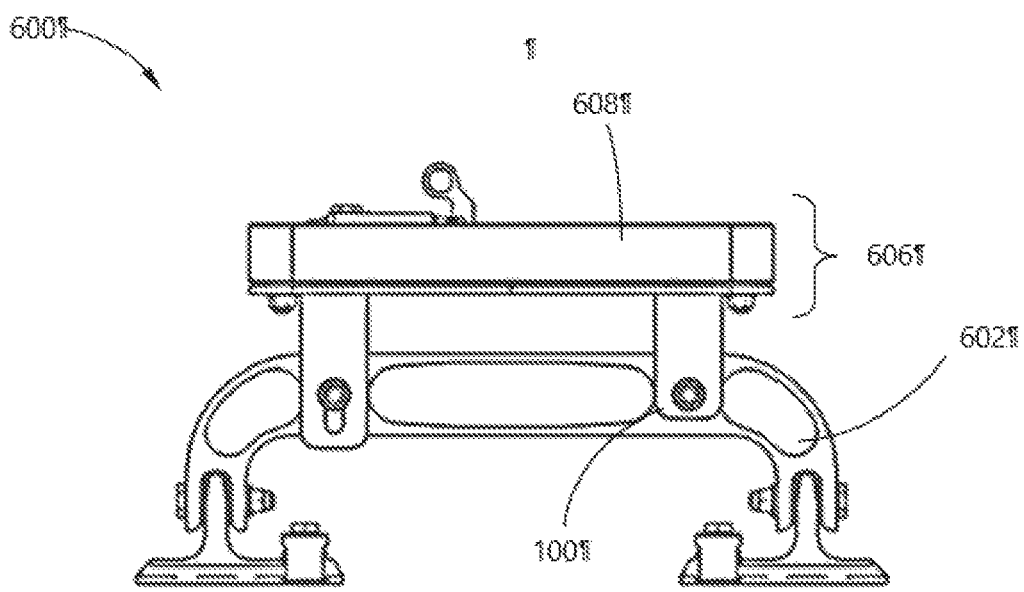
FIG. 6D illustrates a side view of a base assembly depicted in FIG. 6A, in accordance with one or more embodiments of the present disclosure.

Referring now to FIGS. 6B-6D, FIG. 6C illustrates a top view of a base assembly installed on a pair of base rails using pitch clevises, in accordance with one or more embodiments of the present disclosure. A base assembly 600 includes a swivel assembly 606 securely attached by pitch clevises 100 to a pair of base rails 602, which in turn attached to aircraft deck by floor fittings 604.

FIG. 6B illustrates a front view of a base assembly installed on a pair of base rails of using pitch clevises, in accordance with one or more embodiments of the present disclosure. A base assembly 600 includes a swivel assembly 606 securely attached by pitch clevises 100 to a pair of base rails 602, which in turn attached to aircraft deck by floor fittings 604. A swivel outer plate 608 of the swivel assembly 606 may be attached to the pitch clevises 100 with the pins/bolts. Side holes of the pitch clevises 100 may be aligned with holes on the base rail 602 and the clevis pins may be used to securely attach the base rail 602 with the pitch clevises 100. FIG. 6B depicts clearly that no spars are installed between the pair of base rails 602. In this sense, a width created by the pair of base rails 602 is reduced compared to a width created by typical base rails with spars of a base assembly. It is noted that as long as the pair of base rails 602 can support the weight of the swiveling passenger seat, embodiments of the present disclosure may be configured to adjust a width of the base rails 302 so that a footprint of the base assembly 600 is further minimized.

FIG. 6D illustrates a side view of a swivel assembly installed on a pair of base rails using pitch clevises, in accordance with one or more embodiments of the present disclosure. A base assembly 600 includes a swivel assembly 606 securely attached by pitch clevises 100 to a pair of base rails 602, which in turn attached to aircraft deck by floor fittings 604. It is noted that as long as the pair of base rails 602 can support the weight of the swiveling passenger seat, embodiments of the present disclosure may be configured to minimize a length of the base rails 602 (i.e., fore and aft base rail dimension) so that a footprint of the base assembly 600 is further minimized. A combination of minimizing the width of the par of base rails 602 and the length of the base rails 602 may further diminish the footprint of the swiveling passenger seat. In this regard, embodiments of the present disclosure may allow the swiveling passenger seats to be installed in locations previously not possible to be installed due to floor space limitation. For example, the swiveling passenger seats may be installed on an overhead compartment of aircraft. By way of another example, the swiveling passenger seats may be installed on a cargo area of aircraft.

Figure 7:
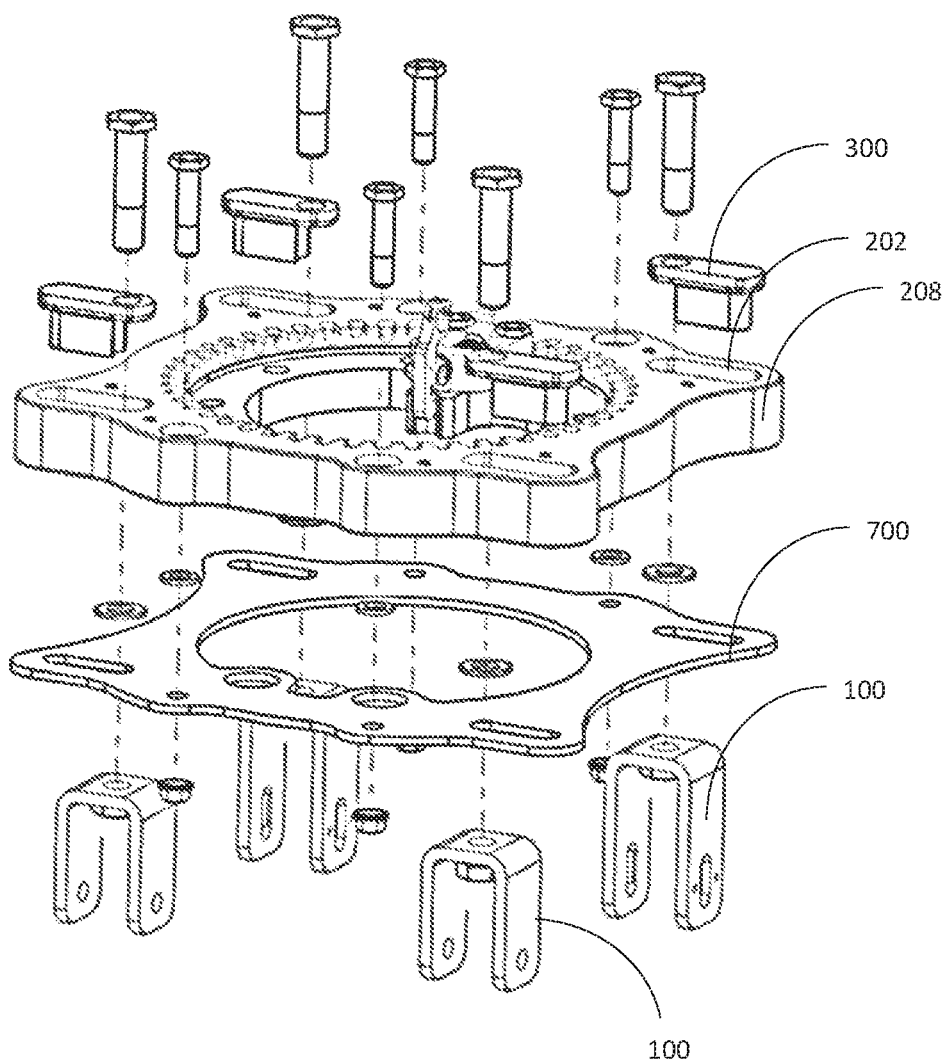
FIG. 7 illustrates an expanded view of a swivel assembly with pitch clevises, in accordance with one or more embodiments of the present disclosure.

FIG. 7 illustrates an expanded view of a swivel assembly with pitch clevises, in accordance with one or more embodiments of the present disclosure. In one embodiment, a base assembly includes swivel spacer 300 disposed within swivel slots 202 of a swivel outer plate 208. A pair of base rails may be coupled with the swivel outer plate 208 by a use of pitch clevises 100. In between the swivel outer plate 208 and the pitch clevises 100 a protection plate 700 may be inserted. The protection plate 700 may provide further structural enhancement to the base assembly. In this sense, the protection plate 700 may be formed from durable materials. For example, the protection plate 700 may be formed from carbon steel, steel iron nickel alloy, stainless steel, tungsten, tungsten carbide, titanium, titanium aluminide, Inconel™, chromium, iron, aluminum, or the mixture thereof.

Figure 8A:
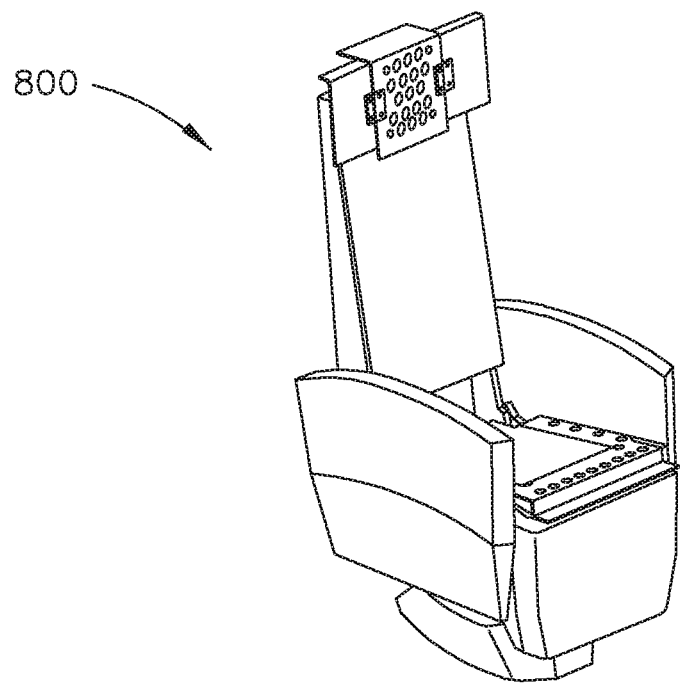
FIG. 8A illustrates an exemplary embodiment of a seat assembly, in accordance with one or more embodiments of the present disclosure.
Figure 8B:
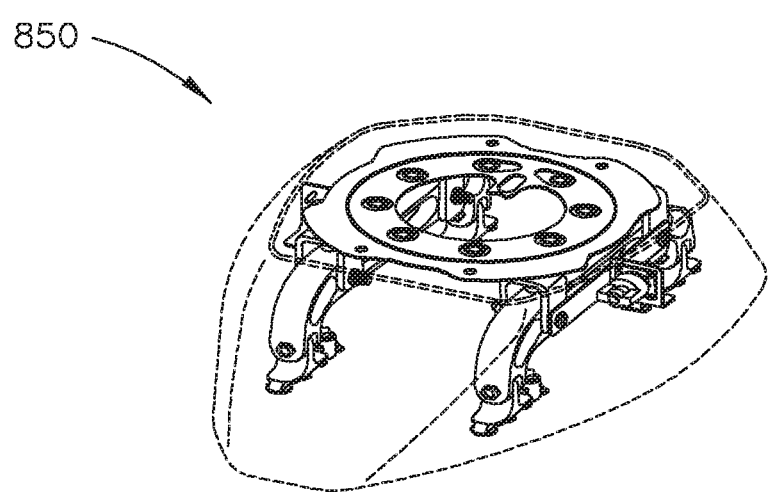
FIG. 8B illustrates a close-up view of the exemplary embodiment of a seat assembly, in accordance with one or more embodiments of the present disclosure.

Referring now to FIGS. 8A-8B, FIG. 8A illustrates an exemplary embodiment of a seat assembly, in accordance with one or more embodiments of the present disclosure. In one embodiment, the seat assembly 800 is installed on a floor of aircraft. The seat assembly in this case may include a streamline shroud. FIG. 8B illustrates a close-up view of the exemplary embodiment of a seat assembly, in accordance with one or more embodiments of the present disclosure. The close-up view of the seat assembly 850 may be configured to be a streamline shroud as shown in FIG. 8B. It is noted that the configurations achieved with embodiments of the present disclosure allow for eliminating a need for a seat track, which is typically required for installation of aircraft seats.

Figure 9A:
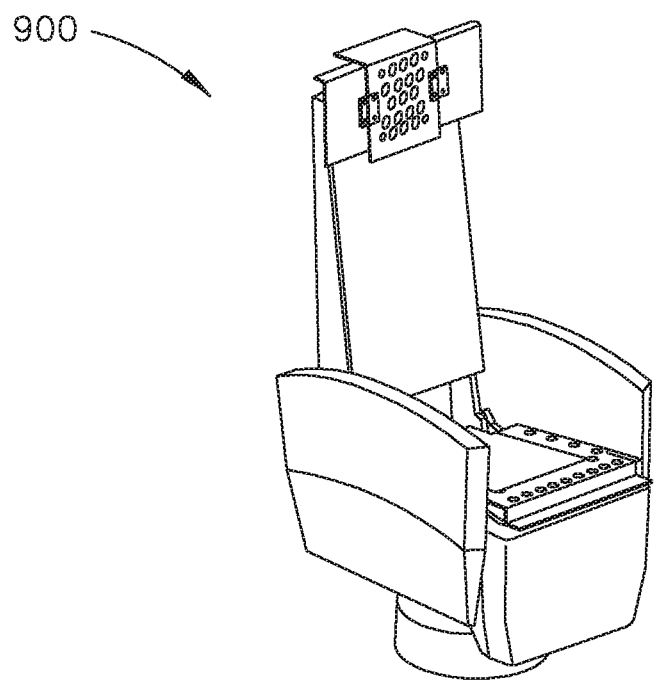
FIG. 9A illustrates an exemplary embodiment of a seat assembly, in accordance with one or more embodiments of the present disclosure.
Figure 9B:
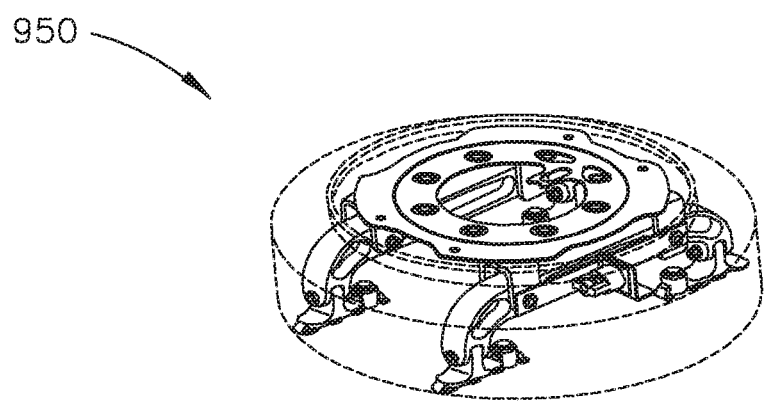
FIG. 9B illustrates a close-up view of the exemplary embodiment of a seat assembly, in accordance with one or more embodiments of the present disclosure.

Referring now to FIGS. 9A-9B, FIG. 9A illustrates an exemplary embodiment of a seat assembly, in accordance with one or more embodiments of the present disclosure. In one embodiment, the seat assembly 900 is installed on a floor of aircraft. The seat assembly in this case may include a circular shroud. FIG. 9B illustrates a close-up view of the exemplary embodiment of a seat assembly, in accordance with one or more embodiments of the present disclosure. The close-up view of the seat assembly 950 may be configured to be a circular shroud as shown in FIG. 9B.

Figure 10:
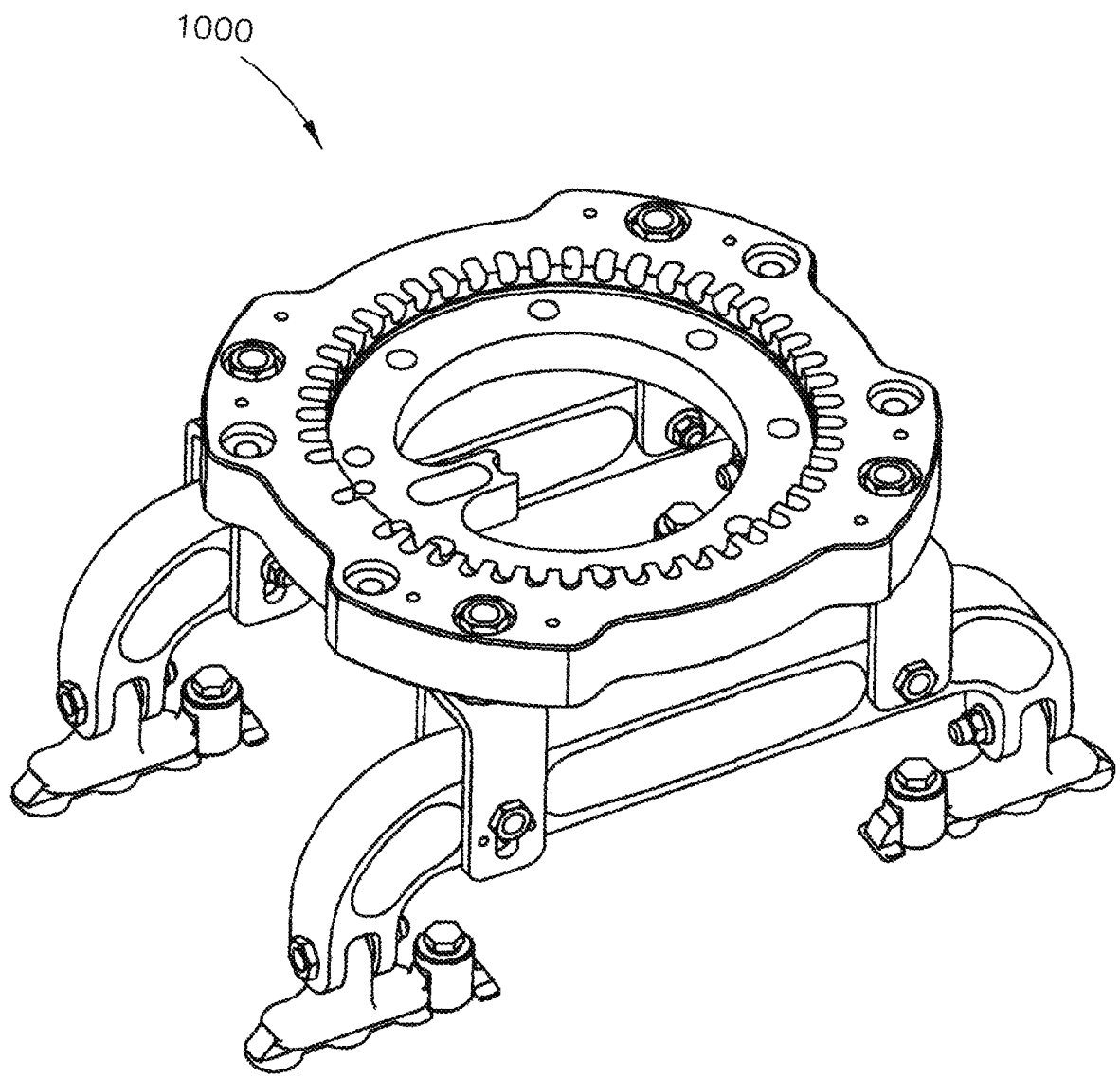
FIG. 10 illustrates a swivel assembly installed on a pair of base rails using pitch clevises without swivel slots, in accordance with one or more embodiments of the present disclosure.

Referring not to FIG. 10, FIG. 10 illustrates a swivel assembly installed on a pair of base rails using pitch clevises without swivel slots, in accordance with one or more embodiments of the present disclosure. In one embodiment, a swivel assembly 1000 without swivel slots may be installed on a pair of base rails using pitch clevises. For example, the swivel assembly 1000 may not have swivel slots and may be coupled to a pair of base rails with the pitch clevises in the same way as described above. In this regard, the swivel assembly 1000 may not utilize swivel spacers. As a result, the swivel assembly 1000 may not be equipped with the adjustability that comes with embodiments of the present disclosure. But it provides a swivel seat without a need of laterally-extending spars typically installed in between the pair of base rails. This leads to less footprint and less weights.

While swiveling passenger seats are usually utilized for private and executive aircraft, commercial aircraft may be equipped with the swiveling passenger seats for premium passengers. For example, the swiveling passenger seats may be installed for first class and/or business class on commercial aircraft. The swiveling passenger seats may give first and/or business class passengers the ability to control the seats other than TTL (i.e., taxing, takeoff, and landing) position, lounge position, and bed position. The swiveling passenger seat may be useful when airlines are interested in creating a premium space such as a studio compartment in an aircraft where a passenger gets the swivel seat, table, and bed all to himself or herself. In such a studio compartment within the aircraft a passenger may use the swivel seat for dining, lounging, and/or working purposes. For example, when the passenger wants to watch a movie using an in-flight entertainment (i.e., IFE) systems after a meal, the passenger may simply rotate the swivel seat to face with the IFE screen.

Seats on aircraft generally are installed on a main deck of the aircraft. However, the seats may be installed on overhead and/or cargo area of the aircraft. For example, the swiveling passenger seats may be installed on an overhead passenger/crew member rest area. By way of another example, the swiveling passenger seats may be installed on a cargo area of the aircraft. Embodiments of the present disclosure may be configured to allow for the use of pitch clevises under such circumstances (e.g., main deck, overhead, and/or cargo area).

Although embodiments of the present disclosure described so far in this specification are generally directed to a passenger seat installed on aircraft, a use of the pitch clevises is not limited to only the passenger seat installed on aircraft and may include passenger seats installed on other modes of transportation. This may include passenger vehicles, buses, trains, ship, or the like.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. An adjustable swiveling passenger seat assembly, comprising:
   a set of base rails, wherein the set of base rails are aligned in parallel;
   a plurality of floor fittings coupling the set of base rails with a set of seat tracks of a floor;
   a plurality of pitch clevises including a first set of pitch clevises coupled on a top surface of a first of the set of base rails and a second set of pitch clevises coupled on a top surface of a second of the set of base rails, each of the plurality of pitch clevises including a hole disposed on a top surface of the plurality of pitch clevises, wherein the plurality of pitch clevises are configured to provide a mechanical strength and stability to support a passenger seat in absence of spars;
   a swivel outer plate aligned in parallel relative to the floor, the swivel outer plate comprising:
      a plurality of slots located on corners of the swivel outer plate; and
      a plurality of spacers disposed within the plurality of slots, wherein the swivel outer plate is coupled to the plurality of pitch clevises through the plurality of the spacers and the hole of each of the plurality of pitch clevises.

2. The adjustable swiveling passenger seat assembly of claim 1, wherein the plurality of spacers each include a spacer protrusion configured to fit within the plurality of slots; wherein the plurality of spacers each include an aperture configured to receive a pin coupling the swivel outer plate and the pitch clevis; wherein a width between the set of base rails is adjustable by rotating the plurality of spacers 180 degrees to change a location of the aperture.

3. The adjustable swiveling passenger seat assembly of claim 1, further comprising:
   a plurality of clevis pins configured to couple the plurality of pitch clevises with each of the set of base rails, wherein the plurality of clevis pins is perpendicularly aligned relative to each of the set of base rails and aligned in parallel relative to the floor.

4. The adjustable swiveling passenger seat assembly of claim 1, wherein the plurality of pitch clevises is formed from at least one of carbon steel, steel iron nickel alloy, stainless steel, tungsten, tungsten carbide, titanium, titanium aluminide, chromium, iron, aluminum, composite materials, carbon fibers, and polymers.

5. The adjustable swiveling passenger seat assembly of claim 1, wherein a shape of the plurality of pitch clevises includes at least one of U-shape, V-shape, C-shape, and mushroom shape.

6. The adjustable swiveling passenger seat assembly of claim 1, wherein the swivel outer plate is configured to support the passenger seat that rotates 360 degrees.

7. The adjustable swiveling passenger seat assembly of claim 1, wherein the adjustable swiveling passenger seat assembly is configured to be used in vehicles.

8. The adjustable swiveling passenger seat assembly of claim 7, wherein the vehicles that the adjustable swiveling passenger seat assembly is used include one of motor vehicles, railed vehicle, watercraft, amphibious vehicles, aircraft, or spacecraft.

9. An adjustable swiveling passenger seat, comprising:
   a set of base rails, wherein the set of base rails are aligned in parallel to each other and are in parallel with a direction of travel;
   a plurality of floor fittings coupling the set of base rails with a set of seat tracks of a floor;
   a plurality of pitch clevises including a first set of pitch clevises coupled on a top surface of a first of the set of base rails and a second set of pitch clevises coupled on a top surface of a second of the set of base rails, each of the plurality of pitch clevises including a hole disposed on a top surface of the plurality of pitch clevises, wherein the plurality of pitch clevises are configured to provide a mechanical strength and stability in absence of spars;
   a swivel outer plate aligned in parallel relative to the floor, the swivel outer plate comprising:
      a plurality of slots located on corners of the swivel plate;
      a plurality of spacers disposed within the plurality of slots, wherein the swivel outer plate is coupled to the plurality of pitch clevises through the plurality of the spacers and the hole of each of the plurality of pitch clevises; and
   a swivel seat mounted on the swivel outer plate.

10. The adjustable swiveling passenger seat of claim 9, wherein the plurality of spacers each include a spacer protrusion configured to fit within the plurality of slots; wherein the plurality of spacers each include an aperture configured to receive a pin coupling the swivel outer plate and the pitch clevis; wherein a width between the set of base rails is adjustable by rotating the plurality of spacers 180 degrees to change a location of the aperture.

11. The adjustable swiveling passenger seat of claim 9, further comprising:
   a plurality of clevis pins configured to couple the plurality of pitch clevises with each of the set of base rails, wherein the plurality of clevises pins is perpendicularly aligned relative to each of the set of base rails and aligned in parallel relative to the floor.

12. The adjustable swiveling passenger seat of claim 9, wherein the plurality of pitch clevises is formed from at least one of carbon steel, steel iron nickel alloy, stainless steel, tungsten, tungsten carbide, titanium, titanium aluminide, chromium, iron, aluminum, composite materials, carbon fibers, and polymers.

13. The adjustable swiveling passenger seat of claim 9, wherein a shape of the plurality of pitch clevises includes at least one of U-shape, V-shape, C-shape, and mushroom shape.

14. The adjustable swiveling passenger seat of claim 9, wherein the floor includes at least one of main deck floor, overhead compartment floor, and cargo compartment floor.

15. The adjustable swiveling passenger seat of claim 9, wherein the swivel seat is configured to rotate 360 degrees at a yaw axis.

16. An adjustable swiveling passenger seat assembly, comprising:
- a set of base rails aligned in parallel to each other and are in parallel with a direction of travel;
- a plurality of floor fittings configured to couple each of the set of base rails with a set of seat tracks of a floor;
- a plurality of pitch clevises including a first set of pitch clevises coupled on a top surface of a first of the set of base rails and a second set of pitch clevises coupled on a top surface of a second of the set of base rails, each of the plurality of pitch clevises including a hole disposed on a top surface of the plurality of pitch clevises, wherein the plurality of pitch clevises are configured to provide mechanical strength and stability in absence of spars;
- a plurality of clevis pins configured to couple the plurality of pitch clevises with each of the set of base rails, wherein the plurality of clevises pins is perpendicularly aligned relative to each of the set of base rails and aligned in parallel relative to the floor;
- a swivel outer plate aligned in parallel relative to the floor, the swivel outer plate comprising:
  - a plurality of slots located on corners of the swivel plate;
  - a plurality of spacers disposed within the plurality of slots, wherein the swivel outer plate is coupled to the plurality of pitch clevises through the plurality of the spacers and the hole of each of the plurality of pitch clevises; and
  - a protection plate disposed between the swivel outer plate and the plurality of pitch clevises.

17. The adjustable swiveling passenger seat of claim 16, wherein the plurality of pitch clevises is formed from at least one of carbon steel, steel iron nickel alloy, stainless steel, tungsten, tungsten carbide, titanium, titanium aluminide, chromium, iron, aluminum, composite materials, carbon fibers, and polymers.

18. The adjustable swiveling passenger seat of claim 16, wherein a shape of the plurality of pitch clevises includes at least one of U-shape, V-shape, C-shaped, and mushroom shape.

19. The adjustable swiveling passenger seat of claim 16, wherein the plurality of spacers each include a spacer protrusion configured to fit within the plurality of slots; wherein the plurality of spacers each include an aperture configured to receive a pin coupling the swivel outer plate and the pitch clevis; wherein a width between the set of base rails is adjustable by rotating the plurality of spacers 180 degrees to change a location of the aperture.

20. The adjustable swiveling passenger seat of claim 16, further comprising:
- a swivel seat mounted on the swivel outer plate, wherein the at least one swivel seat is configured to rotate 360 degrees at a yaw axis.

* * * * *